United States Patent
O'Brien, Jr.

(10) Patent No.: US 6,474,451 B1
(45) Date of Patent: Nov. 5, 2002

(54) SIDE TENSION BRAKE CONDITION SENSOR

(75) Inventor: Gary R. O'Brien, Jr., Riverview, MI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/931,158

(22) Filed: Aug. 16, 2001

(51) Int. Cl.$^7$ .................... F16D 66/00; F16D 65/14
(52) U.S. Cl. .................... 188/1.11 R; 188/107
(58) Field of Search .................... 188/1.11 R, 107, 188/1.11 E, 105, 33, 216; 116/58 R, 58 A, 31, 30, 28 R, 51, 52; 74/505, 506; 200/61.53, 61.76, 61.77, 61.79; 340/548, 545.1

(56) References Cited

U.S. PATENT DOCUMENTS

| | | | |
|---|---|---|---|
| 6,170,619 B1 | | 1/2001 | Sheriff et al. |
| 6,237,722 B1 | * | 5/2001 | Hammond et al. .... 188/1.11 R |
| 6,364,069 B1 | * | 4/2002 | Ring .................... 188/1.11 R |

* cited by examiner

*Primary Examiner*—Douglas C. Butler
(74) *Attorney, Agent, or Firm*—Dennis C. Bremer

(57) ABSTRACT

A sensor for determining the on/off condition of a railroad car handbrake that utilizes a manual wheel which applies tension to a chain extending under the car to the brake setting system and the sensor utilizes a bias member which pushes against the side of the chain so that when the car brakes are not set, and the chain is loose, the bias member moves to distort the chain and such movement causes a sensor, such as a Hall effect device, to approach a magnetic member to produce a signal indicating that the brake is in a released condition.

20 Claims, 1 Drawing Sheet

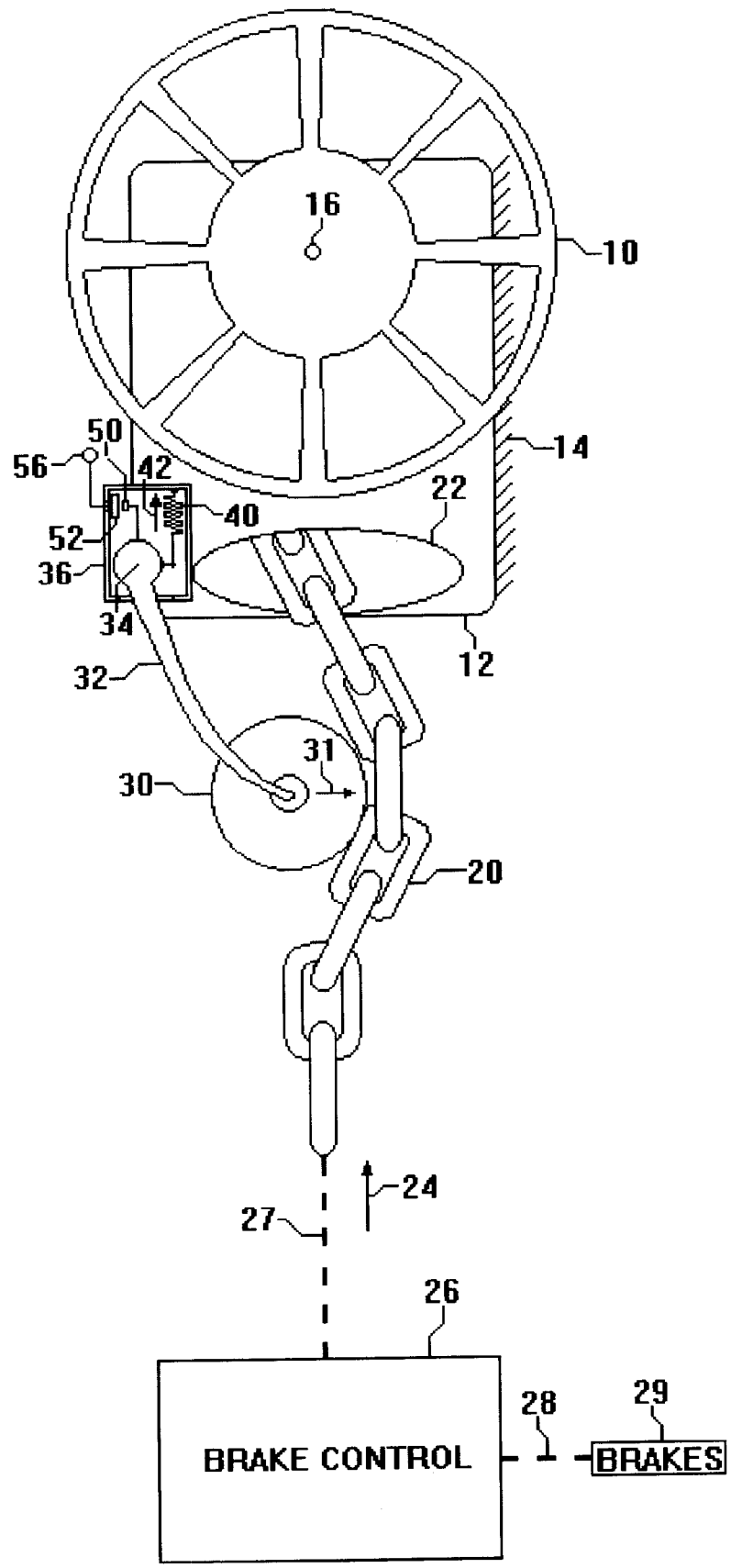

SIDE TENSION BRAKE CONDITION SENSOR

BACKGROUND OF THE INVENTION

1. Field of the Invention

The present invention relates to sensors and more particularly to sensors for determining when a hand brake has been released. The invention finds primary utility in determining when the hand brake of a railroad car has been released or is un-locked.

2. Description of the Prior Art

While the present invention will be described in connection with the brake system of a railroad car, its utility in other applications should be apparent. It is well known in the art of railroad car building to equip the cars with a manual brake system which is actuated by a manually turned brake wheel located on the car. Generally, the brake wheel is attached through gearing to an axel that is attached to a chain running down the car and generally to the undercarriage where the chain is linked to the brake rigging. Turning the brake wheel in a first direction, gathers the chain, putting it in tension, whereby the brakes of the car are engaged to prevent the car wheels from turning. Turning the brake wheel in the opposite direction unwinds the chain from the axel and removes the tension on the chain to disengage the brakes and allow the car wheels to turn. The railroad industry has very high maintenance costs related to wheel damage that may be caused by the brakes of a car being left engaged or "on" when the train begins to move. If the hand brakes of a car are left on, the car wheels will not turn and damage in the form of a worn flat spot will result. In some cases, derailment of the car could even occur. It is therefore desirable to provide a sensor that will indicate the brake setting or, more particularly, will indicate when the brakes of a car are disengaged or "off" before the train is moved.

In a U.S. Pat. No. 6,170,619 B1, entitled "Manual Hand Brake Sensor For A Railroad Car" by Alan V. Sheriff et al which issued Jan. 9, 2001 and is assigned to the assignee of the present invention, a system for determining that the hand brakes are "off" so that the train may be moved without the car wheels being locked, is described claimed. In this patent, a magnetic target is attached to a cam or gear which is driven by the turning of the brake wheel. As the brake wheel is turned to loosen the chain and release the brake, the target moves toward a magnetic sensor or Hall device, which is in a fixed position. When the target is within the sensitivity of the magnetic sensor, a signal is generated to indicate that the brake is "off" and the train may be moved. While this invention operates quite satisfactorily, it is somewhat cumbersome to install on the already existing equipment of the car. For example, the protective box around the mechanism must be opened and the sensor and target installed therein. Furthermore, the sensor is attached to the already existing gears in the brake system and the exact location of the sensor and the target must be determined, usually by trial and error until the desired location is found to assure that the signal produced is truly indicative of an "off" condition. Also, because the brake wheel is turned approximately five complete revolutions to release the brake, the cam or gear where the target mounted must be in a ration of 1 to 5, or greater, with respect to the brake wheel, to prevent multiple signals from the sensor. Accordingly, the cost of installing the brake sensor is thus undesirably high.

SUMMARY OF THE INVENTION

The present invention is an improvement on the invention of the above-mentioned patent and provides a sensor which may be installed on the already existing equipment with a minimum of effort and without using the drive mechanism gears of the brake system or, even opening the box where the drive mechanism is protected. Furthermore, the system operates without concern of the number of brake wheel rotations. This is accomplished by providing a biased device that bears on the chain from the side and the spring force is chosen so that when the chain is taut or under tension (indicating that the brakes are "on") the biased device is forced by the chain to a first position. When the chain is subsequently released, the chain becomes loose (indicating that the brakes are "off") and the biased device is now forceful enough to move to a second position where one or more of the chain links are moved sideways or transverse to its length. A sensor connected to the bias device senses this transverse movement to the second position and produces a signal indicating that the brake has been released and the train may safely proceed. The entire sensing mechanism may be easily installed on the railroad car without having to open or interfere with the brake drive mechanism. The sensor mechanism may be "non-contact" and passive to the chain so as not to violate the integrity of the links or need to support the load that the chain experiences. Furthermore, the installation is low in cost and the bias force needed to displace the unloaded chain in a direction normal to its length is small.

BRIEF DESCRIPTION OF THE DRAWINGS

The FIGURE shows the present invention in a partly schematic view with a portion of the rail car braking mechanism.

DETAILED DESCRIPTION OF THE PREFERRED EMBODIMENTS

In the FIGURE, a hand operated brake wheel, 10, is shown mounted on a protective box, 12, that is affixed to a railway car as shown by hash marks, 14. Brake wheel, 10, is rotatable about a shaft, 16, extending into box, 12, and a chain, 20, passes through an opening, 22, into box, 12, where it is attached to shaft, 16, usually through a pulley or gear (not shown) attached thereto. When it is desired to set or lock the brakes, brake wheel, 10, is manually turned, for example, clockwise, to wind chain, 20, around shaft, 16, (or the pulley or gear attached thereto) thus exerting an upward force on chain, 20, as shown by arrow, 24. Chain, 20, is shown connected to a brake control mechanism, 26, on car, 14, by a connection shown as dashed line, 27. Brake control mechanism, 27, is operable through a connection shown as dashed line, 28, to set and release the brakes of the railroad car as shown by box, 29.

When it is desired to set the brakes, 29, brake wheel, 10, may be rotated manually in a clockwise direction to gather chain, 20, around shaft, 16, (or the pulley or gear attached thereto), and produce the upward force, 24, which, in turn, causes chain, 20, to tighten and activate the brake mechanism, 26, thus setting brakes, 29, and locking the car wheels, (not shown), to prevent rolling. When it is desired to release the car wheels and allow rolling, brake wheel, 10, may be rotated manually in a counter clockwise direction to release the tension on chain, 20, so that the brake control, 26, turns the brakes, 29, "off". In some cases, a release arm (not shown) may be used to release the tension on chain, 20. The apparatus described thus far is common equipment on most railroad cars.

Before moving the train, is customary practice to have a visual inspection of all the cars to assure that the brakes on each car have been released. However, it is often difficult to visually verify that the brakes have been released since the chain, 20, hangs down in both the locked and unlocked condition and whether it is in tension or not is not easily discernable. Accordingly, it is desirable to provide a more reliable way to assure that the brake is released. One such system has been described in the above-mentioned U.S. Pat. No. 6,170,619 B1.

The present invention is an improvement on the previous system and utilizes a bias wheel, 30, or other mechanism, to bear against chain, 20, from the side and apply a transverse force thereto. In the preferred embodiment, wheel, 30, is shown connected to an arm, 32, which is rotatable about a pivot, 34, in a sensor box, 36. Sensor box, 36, is mounted on the car, 14, as, for example, on the protective box, 12, in any convenient fashion such as by sheet metal screws or bolts and has been shown in the FIGURE in cut away fashion to reveal its interior. Arm, 32, is shown connected to a spring, 40, which is shown as a linear spring connected to the top of sensor box, 36, but other types of springs, such as a torsion spring, may be used. In any event, when brake wheel, 10, is sufficiently rotated in a counter-clockwise direction, or when the release arm (not shown) is operated, the brake control, 26, is released, and the chain, 20, becomes loose. In this condition, spring, 40, operates to pull arm, 32, counterclockwise around pivot, 34, and a force, shown by arrow, 31, operates to push wheel, 30, to the right and distort chain, 20, from the side, as seen in the FIGURE. Arm, 32, is then in a position which indicates that the brakes are released. On the other hand, when brake wheel, 10, is turned clockwise, chain, 20, is put under tension and becomes taut so that bias wheel, 30, is pushed to the left producing a clockwise motion of arm, 32 overcoming the force of spring, 40. Arm 32, is then in a position which indicates that the brakes are applied or set.

Arm, 32, carries a position sensor which, in the preferred embodiment, comprises a ferromagnetic target, 50, attached to arm, 32, that moves to the right and left within box, 36, with rotation of arm, 32. A magnetic sensor such as a Hall device, 52, is mounted in a fixed position such as on the interior of box, 36, so that, when arm, 32, rotates counter clockwise, target, 50, moves toward Hall device, 52, and when arm, 32, rotates clockwise, target, 50, moves away from Hall device, 52. The distance between target, 50, and Hall device, 52, is set so that when the brake control is released, arm, 32, has rotated by an amount necessary to bring target, 50, within range of Hall sensor, 52, and a signal is generated to provide an indication that the car brake is released. An indicator light, 56, may be employed to provide visual indication that the brakes are released or an RF transmitter may be employed to transmit the desired signal to a remote location. Of course, many other forms of indication may be used.

It is thus seen that I have provided a simple, non-interfering, inexpensive, reliable and easily mounted device for assuring that railway cars do not have their brakes "on" when the train starts to move. The sensor utilizes the tension in the spring, 40, to provide the force necessary to move the arm, 32, without adding any significant force to the chain, 20. This allows a completely non-interfering mounting arrangement that can easily be put on already existing equipment. Many modifications to the apparatus shown in the preferred embodiment will occur to those having skill in the art. For example, the Hall device, 52, may be mounted on the arm, 32, and the target, 50, mounted on the box, 36, and other types of position sensors or rotation sensors including standard electrical switches may be employed to sense the rotation of arm, 32. Also, the rotatable arm, 32, could be replaced with a linearly movable arm pushing against the side of chain, 20, and a linear sensor could then be employed to determine when the brake control, 26, was released. Furthermore, the signal produced by the sensor could occur when the brakes were set and the lack of a signal from the sensor could then indicate that the brakes were released or first and second signals could be used to indicate both the first and second positions. The invention may also be used to sense the tension in a flexible member other than a chain, as, for example, a cable. Accordingly, I do not wish to be limited to the specific equipment used in connection with the description of the preferred embodiment.

What is claimed is:

1. Apparatus for use with an actuator to set and release brakes, the actuator including a force-producing member that is taut when applying a force to put the brakes in a set condition and which is relaxed when the force is diminished to put the brakes in a released condition, comprising:

a biased member bearing against the side of the elongated flexible force producing member transverse to its length and movable from a first position when the elongated force producing member is relaxed and to a second position when the elongated force producing member is taut; and, a sensor connected to said biased member to determine at least one of the first and second positions as an indication of the condition of the brakes.

2. Apparatus according to claim 1 wherein the actuator includes a manually operated member connected to apply a force to said force-producing member.

3. Apparatus according to claim 2 wherein the manually operated member is the brake wheel of a railway car.

4. Apparatus according to claim 1 wherein the force-producing member is a chain.

5. Apparatus according to claim 2 wherein the force-producing member is a chain.

6. Apparatus according to claim 5 wherein the wheel operates to gather the chain in tension to set the brakes and releases the tension to release the brakes.

7. Apparatus according to claim 1 wherein the bias member includes a rotatable member that is pushed against the force producing member by a spring.

8. Apparatus according to claim 5 wherein the bias member includes a rotatable member that is pushed against the force producing member by a spring.

9. Apparatus according to claim 5 wherein the bias member includes an arm that rotates about an axis.

10. Apparatus according to claim 9 wherein the sensor is connected to the arm.

11. Apparatus according to claim 10 wherein the sensor includes a magnetic sensor and a magnetic member one of which is connected to the arm and the other of which is fixed, the magnetic sensor and magnetic member moving closer to each other as the arm rotates to the first position to produce a signal to indicate that the brakes are in the released condition.

12. The method of determining the set condition of a brake having a brake control that is activated to a set condition by a flexible member, when in tension, and to a release condition, when tension is removed, which flexible member extends to a tension producing device that may be alternately operated to apply or to remove tension to the flexible member to cause the brake to alternately be set or released respectively, comprising the steps of:

A. positioning a bias member to press against the side of the flexible member, transverse to its length so that it assumes one position when the flexible member is in tension and another position when the tension of the flexible member is removed; and B. a sensor to detect the position of the bias member as a determination of the set condition of the brake.

13. The method of claim 12 further including the step of:

A1. mounting the bias member for rotation about an axis so that the first and second positions are positions of rotation.

14. The method of claim 13 further including the step of:

B1. mounting a magnetic sensing device on the bias member to determine its position.

15. The method of claim 14 further including the step of:

B1a. mounting one of a Hall sensor and a magnetic member, on the bias member and the other in a fixed position.

16. The method of claim 12 wherein the flexible member is a chain which includes a portion that extends substantially vertically from the brake control to the tension applying member and further including the step of:

A1. mounting the bias member to apply a substantially horizontal force against the vertical portion of the chain to cause it to move to the second position and distort the chain when it is not in tension and as an indication that the brake is in a released condition.

17. The method of claim 16 further including the steps of:

B1. mounting the bias member for rotation about an axis so that the first and second positions are positions of rotation; and B2. mounting one of a Hall sensor and a magnetic member, on the bias member and the other in a fixed position so that when the arm rotates to the second position, the Hall device produces a signal that indicates that the brake is in the released condition.

18. A system for determining the released condition of a railway car brake system having a brake setting member to which a chain is attached and that extends down the side of the railway car to a brake control, movement of the brake setting member in a first direction causing the chain to be in tension to activate the brake control and set the brakes and movement of the brake setting member in a second direction causing the chain to be out of tension to de-activate the brake control and release the brakes, comprising:

an arm attached to the railway car and including a contact portion which bears against the side of the chain so as to apply a lateral bias force thereto, which bias distorts the chain so that the arm is in a first position when the chain is not in tension but which bias force is overcome when the chain is in tension to move the arm away from the first position; and a sensor attached to the arm and operable to produce and output when the arm is in the first position.

19. Apparatus according to claim 18 wherein the sensor includes a position sensor having first and second relatively movable portions which produce the output when proximate one another, the first portion being mounted to move with the arm so as to become proximate the second portion when the arm is in the first position.

20. Apparatus according to claim 19 further including a signal device which is activated by the output of the sensor as an indication that the brake is in a released condition.

* * * * *